United States Patent [19]

Schellhase et al.

[11] Patent Number: 5,031,858
[45] Date of Patent: Jul. 16, 1991

[54] APPARATUS AND METHOD FOR FOLDING AND LOCKING ROTOR BLADES

[75] Inventors: Ernst C. Schellhase, Fort Worth, Tex.; Dan Anastas, deceased, late of Swarthmore, Pa., by Peggy Anastas, executrix, Delaware, Pa.; Paul E. Keefer, Bedford, Tex.; Cecil E. Covington, Hurst, Tex.; Joseph J. Zierer, Fort Worth, Tex.; William D. Neathery, Fort Worth, Tex.

[73] Assignee: Bell Helicopter Textron, Inc., Forth Worth, Tex.

[21] Appl. No.: 439,980

[22] Filed: Nov. 20, 1989

[51] Int. Cl.⁵ .............................................. B64C 11/28
[52] U.S. Cl. .............................. 244/700 R; 416/142; 416/153
[58] Field of Search ............... 416/128, 129, 142, 143, 416/153; 244/7 C, 7 R

[56] References Cited

U.S. PATENT DOCUMENTS

| | | | |
|---|---|---|---|
| 2,385,464 | 9/1945 | Peterson | 416/143 |
| 3,097,701 | 7/1963 | Buivid | 416/143 |
| 3,187,818 | 6/1965 | Barrett et al. | 416/143 |
| 3,247,907 | 2/1966 | Mosinskis | 416/143 |
| 3,389,878 | 6/1968 | Westrup | 244/7 R |
| 3,749,515 | 7/1973 | Covington et al. | 416/143 |
| 4,436,483 | 3/1984 | Watson | 416/143 |
| 4,691,878 | 9/1987 | Vaughan | 416/142 |
| 4,738,592 | 4/1988 | Cavanaugh | 416/142 |

Primary Examiner—Joseph F. Peters, Jr.
Assistant Examiner—Virna Lissi Mojica
Attorney, Agent, or Firm—Baker & Botts

[57] ABSTRACT

Folding and folding locking apparatus for rotor blades that includes a power actuator for rotating the blades and locking means for securing the blade in the deployed position and securing the blades against rotation of the pitch angle during and when the blades are folded. The apparatus also provides for the complete fairing of the blades at their connections with the rotary drive hub and provides a powered door in the fairing that can be opened and closed to permit the quick and easy folding and redeployment of the blades.

22 Claims, 4 Drawing Sheets

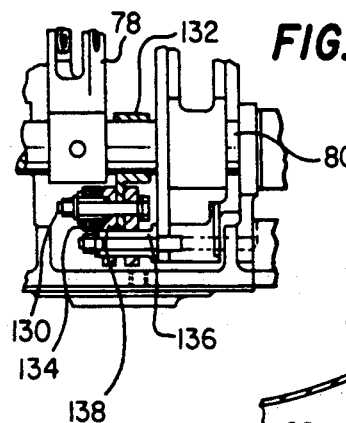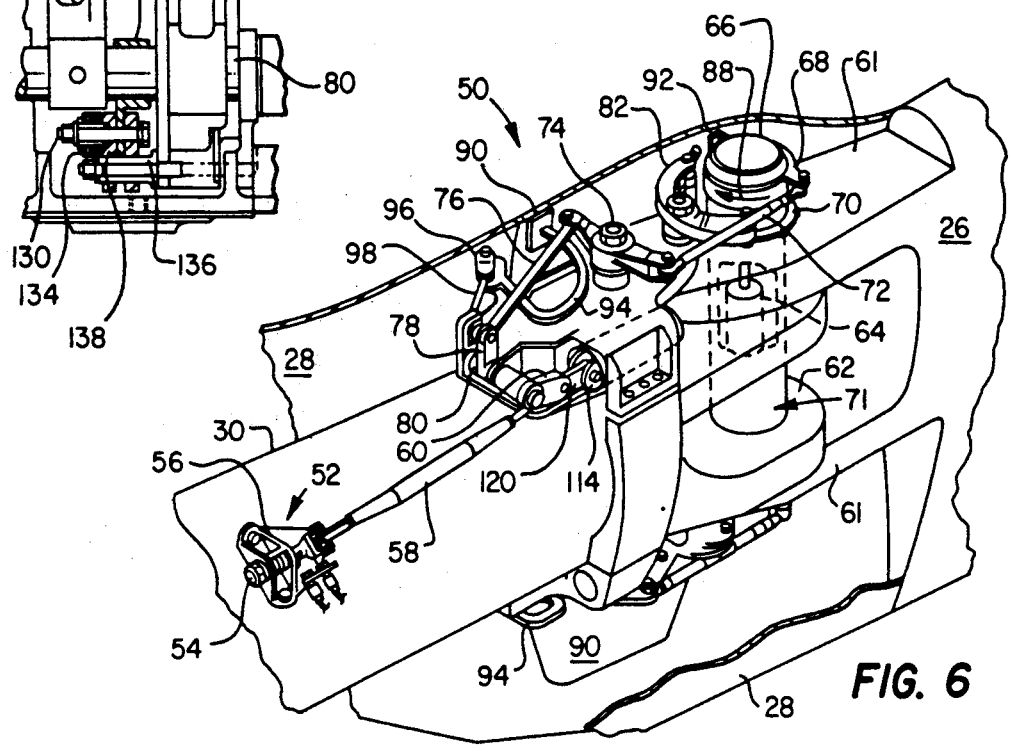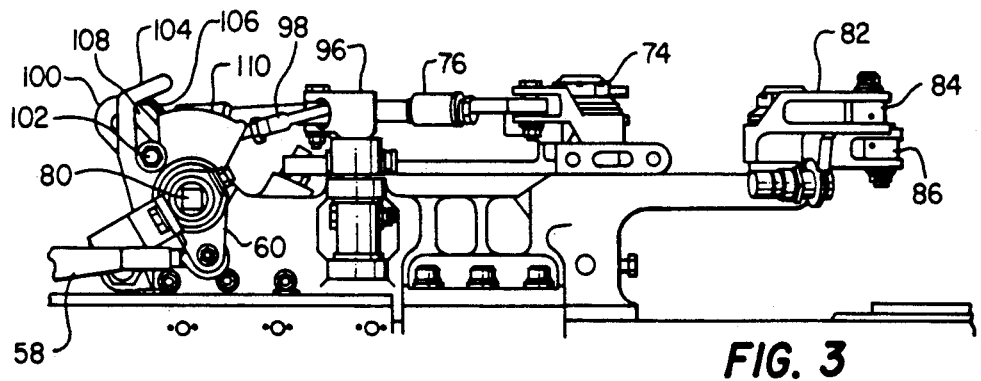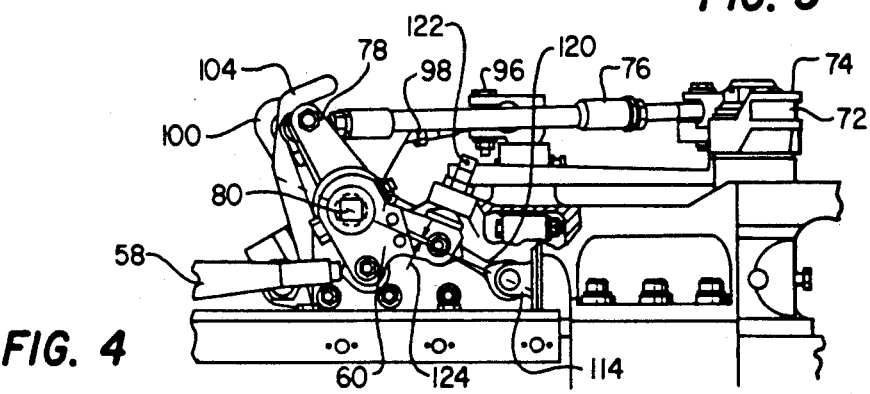

APPARATUS AND METHOD FOR FOLDING AND LOCKING ROTOR BLADES

NOTICE This invention was made with Government support under N00019-83-C-0166 awarded by Department of the Navy, Naval Air Systems Command. The Government has certain rights in this invention.

FIELD OF THE INVENTION

This invention relates generally to aircraft having relatively large rotors thereon, such as helicopters or tiltrotor aircraft. More particularly, but not by way of limitation, this invention relates to improved apparatus and method for folding and locking the rotor blades of rotary wing or tiltrotor aircraft wherein the blades are faired into the rotary drive hub.

BACKGROUND OF THE INVENTION

Rotary wing aircraft and tiltrotor aircraft are difficult to store due to the span covered by the relatively large rotors thereon. The problem has become particularly acute with the use of multi-rotor helicopters and with the advent of tiltrotor aircraft where the rotors are carried at the very tips of the wing. A large amount of space is required to store such aircraft and in some instances, such as on aircraft carriers, the space required for storing such aircraft with the rotors extended or deployed is not available.

With the early rotary wing aircraft, if folding was necessary, manual manipulation of the blades and lock pins retaining the blades was adequate. However, with larger aircraft and particularly with the tiltrotor aircraft where the blades are located very high and at the tips of the wing, power folding has become a virtual necessity.

U.S. Pat. No. 3,625,631 issued to Cecil E. Covington, et al. on Dec. 7, 1971. That patent describes a system for positioning pairs of rotor blades so that they are aligned parallel to the centerline of the fuselage. Since there are no wings on the aircraft, folding the rotor blades in this manner reduces the required storage area essentially to the width and length of the fuselage.

U.S. Pat. No. 3,749,515 issued July 31, 1973 to Cecil Covington, et al. The powered blade folding mechanism described in that patent, does fold one rotary blade relative to the other. Also, during the folding process a locking pin is withdrawn and reinserted automatically so that the blade will be locked in position when deployed.

It is contemplated in U.S. Pat. No. 3,749,515 that such power folding mechanism would be utilized on convert-a-planes so that the blades could be folded to reduce drag during level flight. In that type of aircraft, a separate propeller or propulsion means is utilized during horizontal flight so that the rotor blades are not used for this purpose. With the advent of the tiltrotor aircraft, the same power plant and same rotor blades are utilized for both horizontal and vertical flight. To convert from vertical flight to horizontal flight, the tiltrotors are rotated relative to the aircraft so that the rotors are oriented with the blades in the proper attitude to provide horizontal flight. To reduce the drag on the aircraft during horizontal flight, it is desirable to provide fairings over the rotor drive hub and over the connections between the blades and the rotor hubs. In the tiltrotor aircraft, it is virtually mandatory that such blades be arranged to be power folded if storage space is a consideration.

In order to power fold the blades of faired rotors, it is necessary to not only provide a lock which is automatically withdrawn before folding and which is reinserted after the blade is deployed, but it is also necessary to provide for the removal of a portion of the fairing or fairing door in the direction in which the blade is folded. It is also necessary that such fairing door be securely latched when the blade is deployed.

An additional problem, when the rotors are used in level flight, is that the blades need to be of an adjustable pitchtype. To control the position of the blades when folded and during storing on the tiltrotor-type aircraft, it is necessary that a lock be provided to prevent an inadvertent change in pitch angle.

Accordingly, an object of this invention is to provide an improved apparatus and method for power folding rotor blades that are of the variable pitch-type.

SUMMARY OF THE INVENTION

In one aspect, this invention provides apparatus for folding and locking an adjustable pitch rotor blade that comprises: a blade grip member connecting the blade to the rotor drive with the blade member being pivotal to adjust the pitch angle of the blade; a rotary actuator located in the grip member for pivoting the blade between deployed and folded positions; a blade lock on the grip member operably connected with moveable by the actuator for preventing inadvertent folding of the blade when the blade is in the deployed position; and a pitch lock on the grip member for preventing changing of the blade pitch angle when the blade is folded.

In another aspect, the invention contemplates a method of folding a variable pitch rotor blade having a folding apparatus enclosed in a fairing housing comprising the steps of: opening a fairing door forming part of the fairing housing to a position permitting the blade to fold; moving a blade lock pin to permit the blade to fold; inserting a pitch lock pin to prevent a change in the blade pitch angle; and pivoting the blade from a deployed position into a folded position.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 3 is a side view of a portion of FIG. 2b with certain parts removed to show a cam utilized in the apparatus.

FIG. 4 is a view similar to FIG. 3, but showing an "overcenter" mechanism used in the apparatus.

FIG. 5 is a fragmentary view of a portion of the linkage showing a brake utilized in the device.

FIG. 6 is a pictorial view illustrating the folding and locking apparatus of the invention.

FIGS. 9a–98d illustrate a method according to the invention for folding the blade of the aircraft for storage.

DETAILED DESCRIPTION OF THE PREFERRED EMBODIMENT

Figure 1:
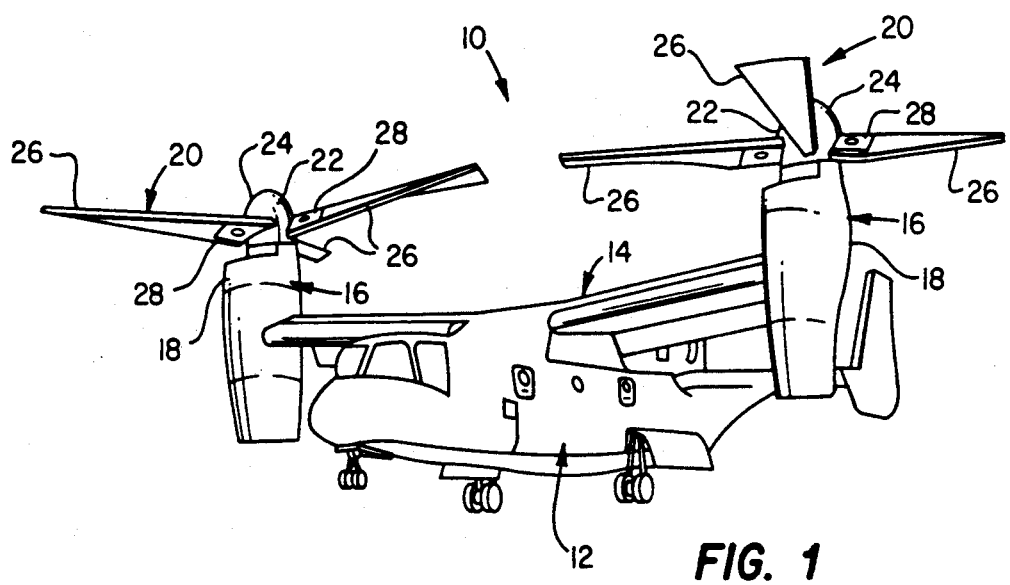
FIG. 1 is a pictorial view of a tiltrotor aircraft incorporating powered, blade folding and locking apparatus that is constructed in accordance with the invention.

Referring to the drawing and to FIG. 1 in particular, shown therein is a tiltrotor aircraft 10 generally designated by the reference character 10. The tiltrotor aircraft includes a centrally located fuselage assembly 12 having a wing assembly 14 affixed to the upper portion thereof and extending transversely with respect to the longitudinal axis of the fuselage 12. At each end of the wing assembly 14 there is provided a tiltrotor 16. Each tiltrotor 16 includes a nacelle 18 that is pivotally attached to the ends of the wing and encases an engine (not shown) for driving a rotor assembly 20. The rotor assemblies 20 each include a drive hub 22 encased in a fairing 24. Attached to the drive hub 22 are a plurality of rotor blades 26. As illustrated, the blades 26 have a circumferential spacing of about 120 degrees. The blades 26 are attached to the rotor drive hub 22 and the attachment thereof is covered by a fairing 28.

Figure 2A:
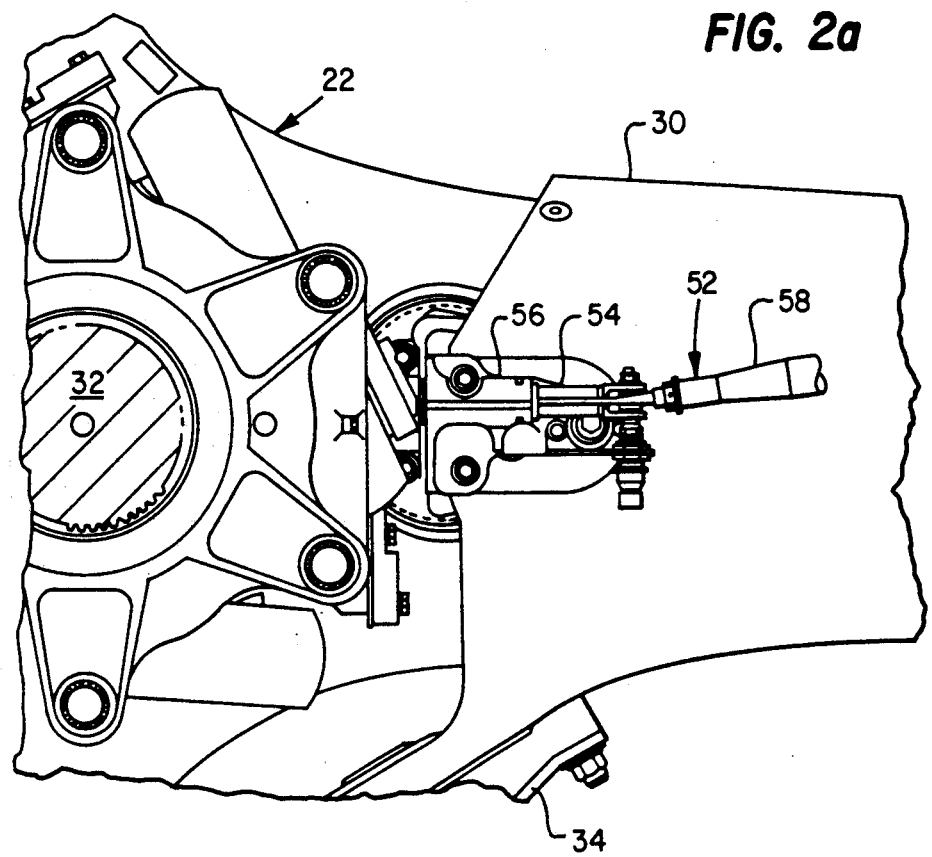
FIGS. 2a and 2b taken together illustrate the apparatus used for connecting the blade to the rotor drive and showing folding and locking apparatus that is constructed in accordance with the invention.
Figure 2B:
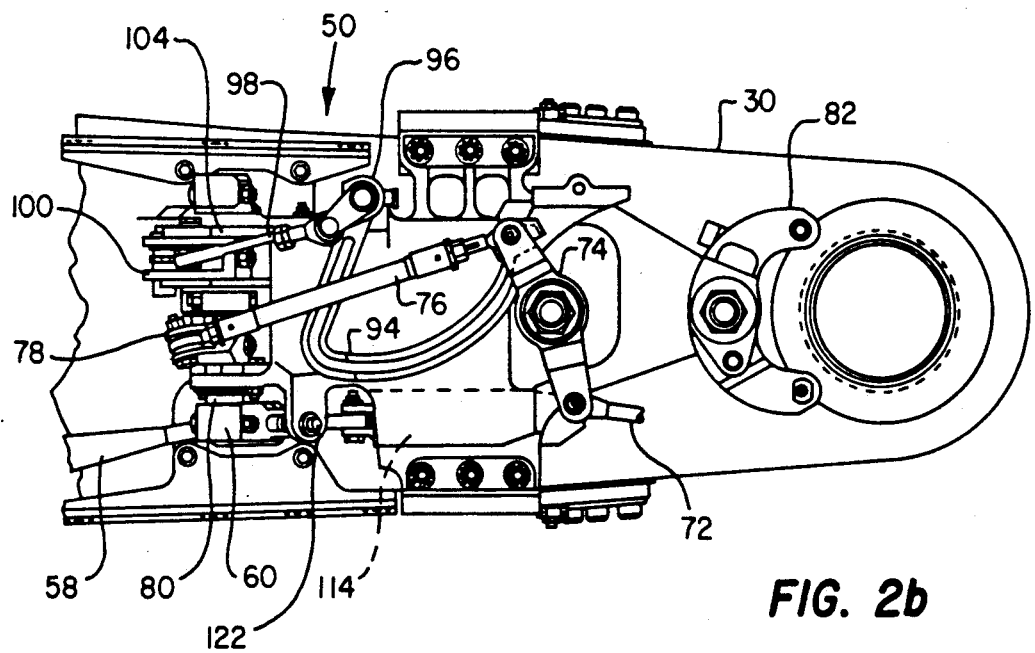

Enclosed within the fairing 28 of each rotor blade 26 is a blade grip member 30 pivotally connected to the hub 22 to permit variation in the pitch angle of the blades 26 as shown in FIGS. 2a and 2b. The rotor blades 26 are pivotally connected to the grip member 30 as is illustrated more clearly in FIGS. 5 and 7.

The rotor drive hubs 22 are powered by the engines (not shown) through shafts 32. To provide for the variation in the pitch angle of the blades 26, a lever arm 34 is mounted on each grip member 30. Each lever arm 34 is connected to a control link (not shown) which is actuated to cause the grip member 30 to rotate about the longitudinal axis of each blade 26.

Forming part of the lock and folding apparatus that is generally designated by the reference character 50 is a pitch lock assembly designated by the reference character 52. As shown in FIG. 2a, the pitch lock assembly 52 includes a pitch lock pin 54 slidingly mounted in a bracket 56 affixed to the grip member 30. Although not shown, it will be understood that the pin 54 will be inserted into an opening in the hub 22 which locks the grip member 30 to the hub 22 and prevents the rotation of the grip member 30 and the attached blade 26 about the axis of the blade. Connected to the pin 54 is a linkage 58 that is operably connected with a bell crank 60. As will be explained more fully hereinafter, actuation of the bell crank 60 at the appropriate time causes the linkage 58 to move the pin 54 into or out of locking engagement with the drive hub 22.

Referring again to FIGS. 6 and 8, it can be seen therein that the blade 26 is pivotally connected to the grip member 30 by a pair of spaced blade tangs 61 and a blade pivot pin 62 which extends therethrough. Mounted within the pivot pin 62 is a drive motor 64 which has planetary gear reducers 66 mounted on each end thereof. The gear reducers 66 each have a pair of output rings or members 68 and 70 that are arranged to move separately depending upon which is locked. The output rings 70 are mounted on the blade tangs 61 so that the blades 26 move with the output rings 70. The gear reducer 66 and output members 68 and 70 comprise a rotary actuator 71 for pivoting each blade 26.

The output ring 68 is connected by a linkage 72 with a bell crank 74 that changes the direction of motion of a linkage 76 that is also connected thereto. The linkage 76 is connected to a bell crank 78 carried by a shaft 80. It will be noted that the bell crank 60 associated with the pitch lock assembly 52 is also mounted on the shaft 80.

The motor 64 and the planetary reducer 66 comprise a rotary actuator for pivoting the blades 26. To control the movement of the output rings 68 and 70 of the planetary gear reducer 66, a pivotally mounted beam 82 carries a pair of cam followers 84 and 86 that engage the output members 68 and 70. The beam 82 is sized and arranged with respect to the output rings 68 and 70 so that the cam follower 84 remains in engagement with the output ring 68 and the cam follower 86 engages the outer surface of the output member 70.

In the deployed condition of the blade 26, the cam follower 86 is located in a detent (not shown) in the surface of the output member 70 preventing rotation of the member 70 while the output ring or member 68 is permitted to rotate in the direction of the arrow 88 (see FIG. 6) through an arc of about 54 degrees. After 54 degrees of travel of the gear reducer 66, the cam follower 84 drops into a recess or detent (not shown) in the surface of the output member 68 locking the member 68 against further movement. When this occurs, the cam follower 86 moves out of the detent in the ring 70 at which time the direction of rotation reverses and the blade 26 is folded toward the position illustrated in FIG. 8.

Although not previously mentioned, the blade 26 cannot fold until the door 90 in the fairing 28 is opened in the direction in which the blade 26 is to be folded. Also, it is necessary to securely latch the fairing door 90 in the closed position when the blade 26 is in the deployed position illustrated in FIG. 6. For this purpose, a latch member 92 is located on the output member 68 of the planetary gear 66. During the first few degrees of rotation of the output member 68, the latch 92 is rotated (compare FIGS. 6 and 8) to unlatch the door 90.

Opening and closing of the fairing door 90 is accomplished through door hinge members 94 which have one end attached to the fairing door 90 and the opposite end to a pivotal bell crank 96. The bell crank 96 is connected by a linkage 98 with a slotted bell crank 100 (see FIG. 3) which is mounted on shaft 80. The slotted bell crank 100 carries a cam follower 102 that rides in a fixed dwell cam 104.

As may be seen more clearly in FIG. 3, the dwell cam 104 includes a slot 106 which has a vertical portion 108 and a generally horizontal portion 110. The arrangement is such that as the first movement of the planetary output member 68 occurs, the slotted bell crank 100 is caused to rotate with the shaft 80. As this rotation occurs, the cam follower 102 rides upwardly in the vertical portion 108 of the dwell cam 104 and in the slotted bell crank 100. Accordingly, no motion occurs in the linkage 98 and no motion of the door hinge 94 occurs.

Also, during the first 54 degrees of rotary motion of the planetary output member 68, the shaft 80 drives the bell crank 60 in the counterclockwise direction as seen in FIG. 4 to move blade lock pin 114 out of locking engagement. The pin 114 is also illustrated in FIGS. 2b, 4, 6, 7 and 8.

Figure 7:
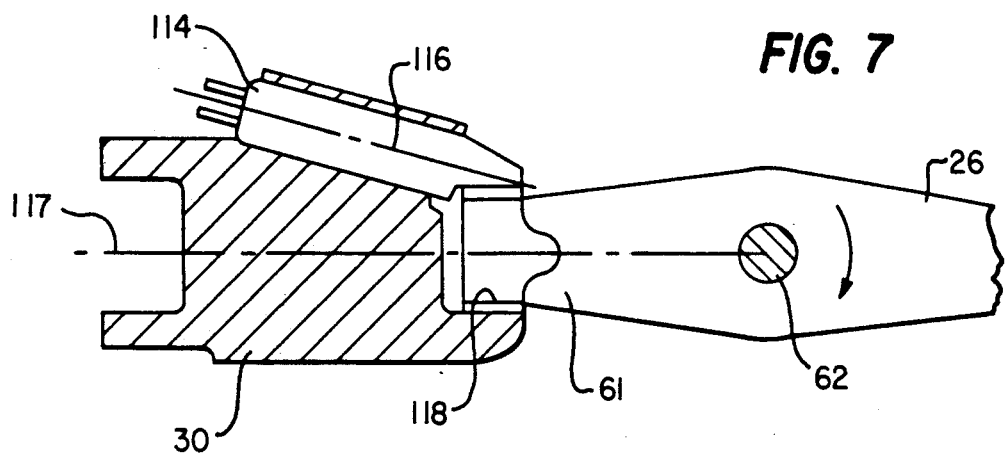
FIG. 7 is an enlarged, somewhat schematic view illustrating a lock pin utilized to lock the rotor blade in the deployed position.

In FIG. 7, it can be seen that the axis 116 of the lock pin 114 is disposed at an angle relative to the axis 118 of the blade 26. The slight angular disposition is preferred so that as the lock pin 114 moves into engagement with the tangs 61 on the rotor blade 26, a camming action occurs retaining the tang 61 of the blade 26 firmly against a blade stop member 118 located on the blade grip 30. Accordingly, and so long as the pin 114 is engaged as shown, the blade 26 is locked in the deployed position.

The blade lock pin 114 is connected by means of an over center mechanism 120 (see FIG. 3) to the bell crank 60. The over center mechanism 120 is provided so that when the pin 114 is in the locked position illustrated in FIGS. 2b, 4, 6 and 7, it cannot be inadvertently dislodged nor can the force of the blade 26 exerted thereon push the pin 114 out of the locked position. An adjustable stop 122 is provided so that the over center distance 124 of the over center mechanism 120 can be adjusted as desired.

FIG. 5 illustrates a brake 130 that is utilized to exert a frictional force against a bell crank 132 mounted on the shaft 80. The brake 130 includes a stacked spring 134 that urges friction brake members 136 and 138 into engagement with the bell crank 132.

The foregoing description refers primarily to a single folding and locking apparatus 50. It will be understood that each blade of the aircraft may be provided with such apparatus as desired or required.

Figure 9A:
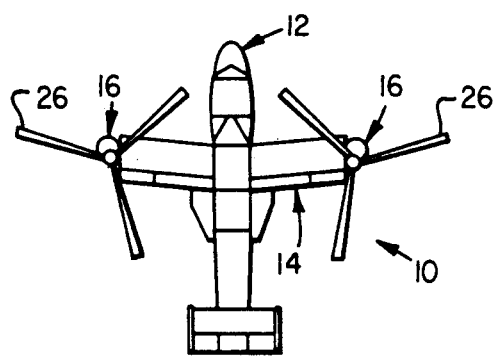
Figure 9B:
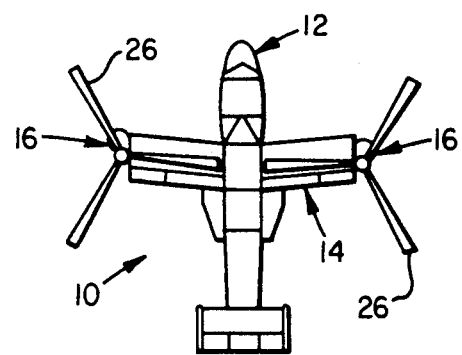
Figure 9C:
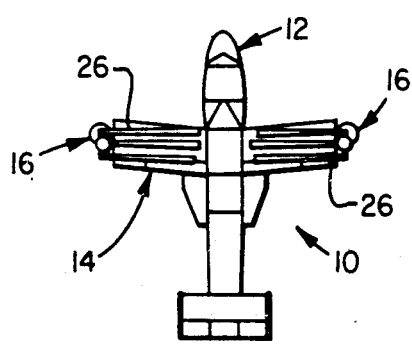

FIGS. 9a through 9d illustrate schematically, a preferred method of folding the blades 26 on the tiltrotor aircraft 10 utilizing the folding and locking apparatus 50 which has been described in detail hereinbefore. As shown in FIG. 9a, the aircraft 10 has come to a stop on the ground, with the rotor blades 26 deployed in random fashion. In FIG. 9b the blades 26 have been rotated so that one of the blades 26 on each tiltrotor or nacelle 16 is generally aligned with the longitudinal axis of the wing 14. In FIG. 9c, it is shown that the remaining two blades 26 on each tiltrotor 16 have been folded so that they lie generally in juxtaposition alongside of the blades 26 which were initially aligned with the longitudinal axis of the wing 14.

Figure 9D:
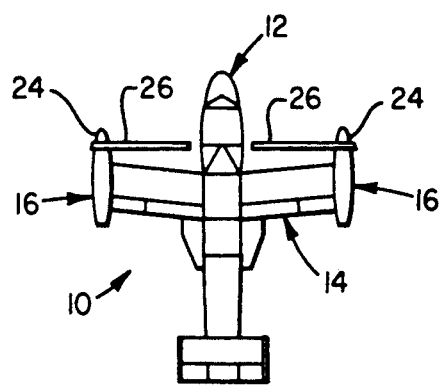

If it is a disadvantage to have the tiltrotor 16 in the vertical position as illustrated in FIGS. 9a, b and c, the tiltrotors 16 can be tilted to a position wherein the blades 26 lie along and generally parallel to the leading edge of the wing 14 as shown in FIG. 9d.

From the foregoing, it can be seen that a substantial saving in storage area for the aircraft 10 has been accomplished. This becomes clearly apparent in viewing FIG. 9a as compared to FIG. 9d.

OPERATION OF THE PREFERRED EMBODIMENT

As previously mentioned, the folding and locking mechanism 50 is utilized to permit the aircraft 10 to be stored in a smaller space by folding of the rotor blades 26.

Figure 8:
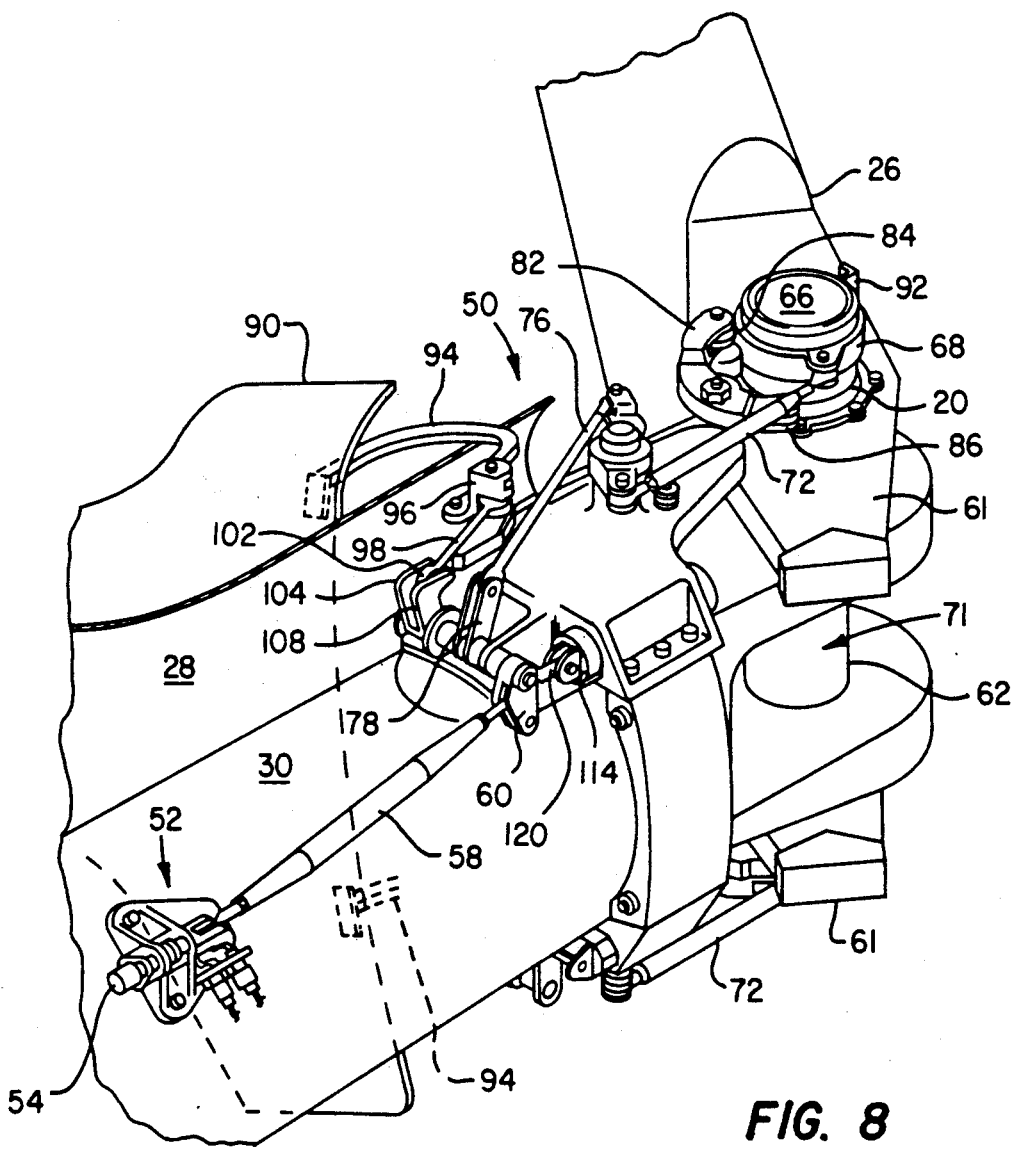
FIG. 8 is a view similar to FIG. 4, but showing the apparatus in another operating position.

Assuming that the blades 26 are initially in the deployed position as illustrated in FIGS. 1, 6 and 9a, the rotary actuator 71 mechanism is actuated causing the motor 64 to rotate the planetary gears 66. When this occurs initially, the output member 70 is held in position by the beam 82 and the blade 26 remains stationary. However, the output ring 68 rotates counterclockwise, as seen in FIG. 6, pushing on linkage 72 and, through bell crank 74, pulling on linkage 76. Movement of linkage 76 rotates shaft 80 in the clockwise direction as seen in FIGS. 3, 4 and 8. When this occurs, the over center mechanism 120 immediately starts to withdraw the blade lock pin 114 from engagement with the blades 26 and the linkage 58 moves the pitch lock pin 54 into engagement with the rotor drive hub 22 locking the blade 26 against rotation in the pitch direction. When the blade lock pin 114 has been withdrawn sufficiently, the blade 26 is in condition to be folded.

Movement of the planetary member 68 in the clockwise direction also moves the fairing door latch 92 to the position illustrated in FIG. 8. This movement releases the fairing door 90 so that it can be opened.

During this same time period, the shaft 80 has rotated and attached the slotted linkage 100 in a clockwise direction moving the cam follower 102 upwardly in the vertical portion 108 of the slot 106 in the dwell cam 104. As previously mentioned, no motion occurs to the fairing door hinge 94 during this time period. However, upon reaching the horizontal portion 110 of the dwell cam 104, the linkage 98 is driven in the appropriate direction to cause the bell crank 96 to move the door hinge 94 in a counterclockwise direction as seen in FIG. 6 opening the fairing door 90 as shown in FIG. 8. The blade 26 is now in condition to be pivoted or folded.

Upon completion of the opening of the fairing door 90, the cam follower 84 drops into the detent provided in the planetary output member 68 locking that member against motion. As this occurs, the cam follower 86 moves out of the detent in the output member 70 and the planetary gear system move in a counterclockwise direction as seen in FIG. 6 and FIG. 8 moving the blade 26 to the folded position as shown in FIG. 8.

To prevent the inadvertent rotation of the shaft 80, the brake 130 engages the bell crank 132. The force necessary to overcome the brake 130 and cause rotation and movement of the shift 80 is exerted by the actuator 71.

When it is desired to deploy the blades 26, the rotary actuator 71 is again actuated. The planetary output member 70 is in the unlocked position and the planetary output member 68 is in the locked position, therefore, the blade 26 is first caused to pivot toward the deployed position illustrated in FIG. 6. The blade 26 pivots until it comes into engagement with the blade stop 118 located on the grip member 30. When this occurs, the cam follower 86 drops into the detent on the planetary output member 70 releasing the planetary member 68 so that it can rotate in the counterclockwise direction. Such rotation pulls the linkage 72 and pushes the linkage 76 due to the bell crank 74 and rotates the shaft 80 in the counterclockwise direction.

Since the cam follower 102 is on the flat portion 110 of the cam 104, the fairing door 90 is closed. Simultaneously, the bell crank 60 swings the over center mechanism 120 into position to move the lock pin 114 to the position illustrated in FIG. 7 locking the blade 26 against pivotal motion.

Simultaneously, the bell crank 60 moves in a direction to pull the linkage 58 away from the rotary drive hub 22 extracting the blade pitch lock pin 54 therefrom so that pitch adjustment of the blade 26 can occur.

The final action of redeploying the blade 26 occurs as the planetary output member 68 continues to rotate in the counterclockwise direction although no motion of the shaft 80 occurs due to the movement of the cam follower 102 through the vertical portion 108 of the slot 106. The final action is that the latch member 92 moves in engagement with the fairing door 90 latching it securely into the closed position.

It should be pointed out that on each of the blades 26 there is provided an upper and lower locking and folding mechanism which are essentially identical in construction. It should also be pointed out that although not described in detail, a number of sensors are located in the locking apparatus 50 that give warnings or signals related to the locked and unlocked condition of the various components of the blade locking and folding apparatus 50.

From the foregoing detailed description, it will be appreciated that the apparatus describes provides a powered, folding and locking apparatus that is effective to quickly and effectively fold and deploy the rotor blades of aircraft of the type described, thus providing an effective means of reducing the necessary storage area.

It will also be understood that only one embodiment has been described in detail hereinbefore and that many changes and modifications can be made thereto without departing from the spirit and scope of the invention.

What is claimed:

1. A method of folding a variable pitch rotor blade having the folding apparatus enclosed in a fairing housing comprising the steps of:
   opening a fairing door forming part of the fairing housing to a position to permit said blade to fold;
   removing a blade lock pin to permit said blade to fold;
   simultaneously inserting a patch lock pin to prevent a change in the blade pitch angle in response to said step of removing the blade lock pin; and
   pivoting said blade from a deployed position into the folded position.

2. The method of claim 1 and including the steps of:
   pivoting said blade to the deployed position from the folded position;
   inserting said blade lock pin to retain said blade in the deployed position;
   removing said pitch lock pin to permit changes in the blade pitch angle; and
   closing said fairing door to fully enclose said folding apparatus.

3. The method of claim 2 and including the step of latching the fairing door in the closed position.

4. Folding and locking apparatus for an adjustable pitch rotor blade comprising:
   a blade grip member for connecting the blade to a rotor drive, said grip member being pivotal to adjust the pitch angle of the blade, and said grip member pivotally connected to the blade to allow the blade to pivot between folded and deployed positions;
   rotary actuator means located in said grip member for pivoting the blade between deployed and folded positions; and
   blade lock means on said grip member operably connected with and moveable by said actuator means for preventing inadvertent folding of the blade when the blade is in the deployed position, and for preventing changing of the pitch angle when the blade is folded, said blade lock means includes an elongated blade lock pin mounted in said grip member for reciprocation between locked and unlocked positions and motion conversion means on said grip member connected with said rotary actuator means and with said blade lock pin for converting pivotal motion of said actuator means to linear motion of said blade lock pin.

5. The apparatus of claim 4 and also including:
   a stop member located on said grip member having a surface engageable with said blade when said blade is in the deployed position for positioning said blade at the desired deployment; and
   said elongated lock pin having a longitudinal axis disposed at an angle relative to the surface on said stop member and said pin moves along said axis for wedging said blade against said stop member.

6. The apparatus of claim 5 and including over-center means connected with said blade lock pin for preventing said blade lock pin from moving out of locking engagement with said blade except when said blade lock pin is moved out of engagement with said blade by said over-center means.

7. The apparatus of claim 6 wherein said blade lock means includes a pitch lock pin moveable simultaneously with and in response to movement of said blade lock pin between locked and unlocked positions to prevent and permit blade pitch adjustment when said blade is folded and deployed, respectively.

8. The apparatus of claim 7 and also including:
   fairing housing means for covering said folding and locking apparatus reducing drag on said rotor blade; and
   a fairing door member pivotal relative to said fairing housing corrected to and activated by said actuator means for movement between a closed position wherein said folding and locking apparatus is covered and an open position wherein said fairing door is pivoted to a position clear of the folded position of said blades.

9. The apparatus of claim 8 wherein said blade lock means also includes a fairing door member latch member carried by said rotary actuator means and moveable thereby into and out of latching engagement with said fairing door member when said blade is deployed and folded, respectively.

10. The apparatus of claim 4 and including over-center means connected with said blade lock pin for preventing said blade lock pin from moving out of locking engagement with said blade except when said blade lock pin is moved out of engagement with said blade by said over-center means.

11. The apparatus of claim 4 and also including:
    fairing housing means for covering said folding and locking apparatus reducing drag on said rotor blade; and
    a fairing door member pivotal relative to said fairing housing corrected to and activated by said actuator means for movement between a closed position wherein said folding and locking apparatus is covered and an open position wherein said fairing door is pivoted to a position clear of the folded position of said blades.

12. The apparatus of claim 11 wherein said blade lock means also includes a fairing door member latch member carried by said rotary actuator means and moveable thereby into and out of latching engagement with said fairing door member when said blade is deployed and folded, respectively.

13. Folding and locking apparatus for an adjustable pitch rotor blade comprising:
    a blade grip member for connecting the blade to a rotor drive, said grip member being pivotal to adjust the pitch angle of said blade;
    rotary actuator means located in said grip member for pivoting the blade between deployed and folded positions, said rotary actuator means includes gear reducer means including first and second output members pivotal independently and together, said first member connected to said blade lock means and said second member connected to said blade and motor means for driving said gear reducer means;

a limit cam for permitting predetermined pivotal movement of said first and second output members in one direction and preventing movement of said second output member while permitting pivotal movement of said second output member in the opposite direction; and blade lock means on said grip member operably connected with and moveable by said actuator means for preventing inadvertent folding of said blade when said blade is in the deployed position, and for preventing changing of the pitch angle when said blade is folded.

14. Folding and locking apparatus for an adjustable pitch rotor blade comprising:

a blade grip member for connecting the blade to a rotor drive, said grip member being pivotal to adjust the pitch angle of said blade;

rotary actuator means located in said grip member for pivoting the blade between deployed and folding positions; and blade lock means including a blade lock pin on said grip member operably connected with and moveable by said actuator means for preventing inadvertent folding of said blade when said blade is in the deployed position and a pitch lock pin moveable simultaneously with and in response to movement of said blade lock pin between locked and unlocked positions to prevent and permit blade pitch adjustment when said blade is folded and deployed, respectively.

15. Folding and locking apparatus for an adjustable pitch rotor blade comprising:

a blade grip member for connecting the blade to a rotor drive, said grip member being pivotal to adjust the pitch angle of said blade;

rotary actuator means located in said grip member for pivoting the blade between deployed and folded positions;

blade lock means on said grip member operably connected with and moveable by said actuator means for preventing inadvertent folding of said blade when said blade is in the deployed position, and for preventing changing of the pitch angle when said blade is folded;

fairing housing means for covering said folding and locking apparatus for reducing drag on said rotor blade; and a fairing door member pivotal relative to said fairing housing connected to and activated by said actuator means for movement between a closed position wherein said folding and locking apparatus is covered and an open position wherein said fairing door is pivoted to a position clear of the folded position of said blades.

16. The apparatus of claim 15 wherein said blade lock means also includes a fairing door member latch member carried by said rotary actuator means and moveable thereby into and out of latching engagement with said fairing door member when said blade is deployed and folded, respectively.

17. Folding and locking apparatus for an adjustable pitch rotor blade comprising:

a blade grip member for connecting the blade to a rotor drive, said grip member being pivotal to adjust the pitch angle of said blade;

rotary actuator means located in said grip member for pivoting the blade between deployed and folded positions;

blade lock means on said grip member operably connected with and moveable by said actuator means for preventing inadvertent folding of said blade when said blade is in the deployed position, and for preventing changing of the pitch angle when said blade is folded, said blade lock means also includes a fairing door member latch member carried by said rotary actuator means and moveable thereby into and out of latching engagement with a fairing door member when said blade is deployed and folded, respectively;

fairing housing means for covering said folding and locking apparatus reducing drag on said rotor blade; and a fairing door member pivotal relative to said fairing housing connected to and activated by said actuator means for movement between a closed position wherein said folding and locking apparatus is covered and an open position wherein said fairing door is pivoted to a position clear of the folded position of said blades; and a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door.

18. Folding and locking apparatus for an adjustable pitch rotor blade comprising:

a blade grip member for connecting the blade to a rotor drive, said grip member being pivotal to adjust the pitch angle of said blade;

rotary actuator means located in said grip member for pivoting the blade between deployed and folded positions;

blade lock means on said grip member operably connected with and moveable by said actuator means for preventing inadvertent folding of said blade when said blade is in the deployed position, and for preventing changing of the pitch angle when said blade is folded, said blade lock means includes an elongated blade lock pin mounted in said grip member for reciprocation between locked and unlocked positions and motion conversion means on said grip member connected with said rotary actuator means and with said blade lock pin for converting pivotal motion of said actuator means to linear motion of said blade lock pin, said blade lock means also includes a fairing door member latch member carried by said rotary actuator means and moveable thereby into and out of latching engagement with a fairing door member when said blade is deployed and folded, respectively;

fairing housing means for covering said folding and locking apparatus reducing drag on said rotor blade;

a fairing door member pivotal relative to said fairing housing connected to and activated by said actuator means for movement between a closed position wherein said folding and locking apparatus is covered and an open position wherein said fairing door is pivoted to a position clear of the folded position of said blades; and a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door.

19. Folding and locking apparatus for an adjustable pitch rotor blade comprising:
    a blade grip member for connecting the blade to a rotor drive, said grip member being pivotal to adjust the pitch angle of said blade;
    rotary actuator means located in said grip member for pivoting the blade between deployed and folded positions;
    blade lock means on said grip member operable connected with and moveable by said actuator means for preventing inadvertent folding of said blade when said blade is in the deployed position, and for preventing changing of the pitch angle when said blade is folded, said blade lock means includes an elongated blade lock pin mounted in said grip member for reciprocation between locked and unlocked positions and motion conversion means on said grip member connected with said rotary actuator means and with said blade lock pin for converting pivotal motion of said actuator means to linear motion of said blade lock pin and a pitch lock pin moveable in response to movement of said blade lock pin between locked and unlocked positions to prevent and permit blade pitch adjustment when said blade is folded and deployed, respectively, said blade lock means also includes a fairing door member latch member carried by said rotary actuator means and moveable thereby into and out of latching engagement with said fairing door member when said blade is deployed and folded, respectively;
    a stop member located on said grip member having a surface engageable with said blade when said blade is in the deployed position for positioning said blade at the desired deployment, said elongated lock pin having a longitudinal axis disposed at an angle relative to the surface on said stop member and said pin moves along said axis for wedging said blade against said stop member;
    over-center means connected with said blade lock pin for preventing said blade lock pin from moving out of locking engagement with said blade except when said blade lock pin is moved out of engagement with said blade by said over-center means;
    fairing housing means for covering said folding and locking apparatus for reducing drag on said rotor blade;
    a fairing door member pivotal relative to said fairing housing connected to and activated by said actuator means for movement between a closed position wherein said folding and locking apparatus is covered and an open position wherein said fairing door is pivoted to a position clear of the folded position of said blades; and
    a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door.

20. Folding and locking apparatus for an adjustable pitch rotor blade comprising:
    a blade grip member for connecting the blade to a rotor drive, said grip member being pivotal to adjust the pitch angle of said blade;
    rotary actuator means located in said grip member for pivoting the blade between deployed and folded positions;
    blade lock means on said grip member operably connected with and moveable by said actuator means for preventing inadvertent folding of said blade when said blade is in the deployed position, and for preventing changing of the pitch angle when said blade is folded, said blade lock means also includes a fairing door member latch member carried by said rotary actuator means and moveable thereby into and out of latching engagement with a fairing door member when said blade is deployed and folded, respectively;
    fairing housing means for covering said folding and locking apparatus reducing drag on said rotor blade; and
    a fairing door member pivotal relative to said fairing housing connected to and activated by said actuator means for movement between a closed position wherein said folding and locking apparatus is covered and an open position wherein said fairing door is pivoted to a position clear of the folded position of said blades;
    a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door; and
    friction brake means for preventing the inadvertent movement of said blade lock pin out of locking engagement with said blade.

21. Folding and locking apparatus for an adjustable pitch rotor blade comprising:
    a blade grip member for connecting the blade to a rotor drive, said grip member being pivotal to adjust the pitch angle of said blade;
    rotary actuator means located in said grip member for pivoting the blade between deployed and folding positions;
    blade lock means on said grip member operably connected with and moveable by said actuator means for preventing inadvertent folding of said blade when said blade is in the deployed position, and for preventing changing of the pitch angle when said blade is folded, said blade lock means includes an elongated blade lock pin mounted in said grip member for reciprocation between locked and unlocked positions and motion conversion means on said grip member connected with said rotary actuator means and with said blade lock pin for converting pivotal motion of said actuator means to linear motion of said blade lock pin, said blade lock means also includes a fairing door member latch member carried by said rotary actuator means and moveable thereby into and out of latching engagement with a fairing door member when said blade is deployed and folded, respectively;

fairing housing means for covering said folding and locking apparatus reducing drag on said rotor blade;

a fairing door member pivotal relative to said fairing housing connected to and activated by said actuator means for movement between a closed position wherein said folding and locking apparatus is covered and an open position wherein said fairing door is pivoted to a position clear of the folded position of said blades;

a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door; and friction brake means for preventing the inadvertent movement of said blade lock pin out of locking engagement with said blade.

22. Folding and locking apparatus for an adjustable pitch rotor blade comprising:

a blade grip member for connecting the blade to a rotor drive, said grip member being pivotal to adjust the pitch angle of said blade;

rotary actuator means located in said grip member for pivoting the blade between deployed and folded positions; and blade lock means on said grip member operably connected with and moveable by said actuator means for preventing inadvertent folding of said blade when said blade is in the deployed position, and for preventing changing of the pitch angle when said blade is folded, said blade lock means includes an elongated blade lock pin mounted in said grip member for reciprocation between locked and unlocked positions and motion conversion means on said grip member connected with said rotary actuator means and with said blade lock pin for converting pivotal motion of said actuator means to linear motion of said blade lock pin and a pitch lock pin moveable in response to movement of said blade lock pin between locked and unlocked positions to prevent and permit blade pitch adjustment when said blade is folded and deployed, respectively, said blade lock means also includes a fairing door member latch member carried by said rotary actuator means and moveable thereby into and out of latching engagement with said fairing door member when said blade is deployed and folded, respectively;

a stop member located on said grip member having a surface engageable with said blade when said blade is in the deployed position for positioning said blade at the desired deployment, said elongated lock pin having a longitudinal axis disposed at an angle relative to the surface on said stop member and said pin moves along said axis for wedging said blade against said stop member;

over-center means connected with said blade lock pin for preventing said blade lock pin from moving out of locking engagement with said blade except when said blade lock pin is moved out of engagement with said blade by said over-center means;

fairing housing means for covering said folding and locking apparatus reducing drag on said rotor blade;

a fairing door member pivotal relative to said fairing housing corrected to and activated by said actuator means for movement between a closed position wherein said folding and locking apparatus is covered and an open position wherein said fairing door is pivoted to a position clear of the folded position of said blades;

a dwell cam member operably connected to said rotary actuator means and linkage means, including a cam follower member moveable in response to movement of said rotary actuator means, said dwell cam member having a slot receiving said cam follower member for permitting movement of said rotary actuator means to unlatch said fairing door prior to opening said fairing door and to latch said door after closing said door; and friction brake means for preventing the inadvertent movement of said blade lock pin out of locking engagement with said blade.

* * * * *